United States Patent [19]

Gove et al.

[11] Patent Number: 5,497,197
[45] Date of Patent: Mar. 5, 1996

[54] SYSTEM AND METHOD FOR PACKAGING DATA INTO VIDEO PROCESSOR

[75] Inventors: Robert J. Gove, Plano; Donald B. Doherty, Irving; Stephen W. Marshall, Richardson; Carl W. Davis, Plano; Joseph G. Egan, Garland; Richard C. Meyer; Jeffrey B. Sampsell, both of Plano; Scott D. Heimbuch, Dallas, all of Tex.

[73] Assignee: Texas Instruments Incorporated, Dallas, Tex.

[21] Appl. No.: 147,801

[22] Filed: Nov. 4, 1993

[51] Int. Cl.⁶ .............................. H04N 7/12; H04N 11/02
[52] U.S. Cl. .................................. 348/388; 348/384
[58] Field of Search ................................ 348/568, 388, 348/446, 448, 384; 345/84, 100, 196, 201, 202; 370/118; 365/230.02; 358/431; 341/67

[56] References Cited

U.S. PATENT DOCUMENTS 4,345,276  8/1982  Colomb .................................. 358/287
5,097,257  3/1992  Clough et al. .......................... 345/196

*Primary Examiner*—James J. Groody
*Assistant Examiner*—Cheryl Cohen
*Attorney, Agent, or Firm*—Julie L. Reed; Richard L. Donaldson; Rene E. Grossman

[57] ABSTRACT

A system (30) for packing data into a video processor is provided. System (30) comprises demultiplexer (32), first and second first in-first out buffer memories (34) and (36), and multiplexer (38). Demultiplexer (32) divides a field of video data into first and second parts (42) and (44). First and second parts (42) and (44) are stored in first first in-first out buffer memories (34) and (36), respectively. Multiplexer (38) combines one line from first first in-first out buffer memory (34) with one line from second first in-first out buffer memory (36) to form a single line for processing.

10 Claims, 3 Drawing Sheets

SYSTEM AND METHOD FOR PACKAGING DATA INTO VIDEO PROCESSOR

CROSS REFERENCE TO RELATED PATENTS AND APPLICATIONS

The following patents and applications are related to the present application, and are incorporated by reference herein:

U.S. Pat. No. 4,615,595, entitled, "FRAME ADDRESSED SPATIAL LIGHT MODULATOR";

U.S. Pat. No. 5,079,544, entitled, "STANDARD INDEPENDENT DIGITIZED VIDEO SYSTEM";

U.S. Pat. No. 4,939,575, entitled, "FAULT-TOLERANT SERIAL VIDEO PROCESSOR DEVICE";

U.S. Ser. No. 07/678,761, Atty Docket No. TI-15721 "DMD ARCHITECTURE AND TIMING FOR USE IN A PULSE-WIDTH MODULATED DISPLAY SYSTEM";

U.S. Ser. No. 08/147,249, Atty Docket No. TI-17855 "DIGITAL TELEVISION SYSTEM"; and U.S. Ser. No. 08/148,768, Atty Docket No. TI-17859 "VIDEO DATA FORMATTER FOR A DIGITAL TELEVISION SYSTEM".

1. Technical Field of the Invention

This invention relates in general to the field of electronic devices. More particularly, this invention relates to a system and method for packing data into a video processor.

2. Background of the Invention

Video signals may be processed using known devices. The video signals may be processed for various different applications. One known video processor is the Scanline Video Processor produced by TEXAS INSTRUMENTS INCORPORATED. This video processor operates on one line of video signal at a time. The video processor has a plurality of processing elements. The number of pixels that may be processed at one time is limited by the number of processing elements.

In a typical processing application, the number of pixels in one line of video signal is less than the number of processing elements of the video processor. Therefore, the video processor is not efficiently used.

SUMMARY OF THE INVENTION

In accordance with the present invention, a system for packing data into a video processor is disclosed that substantially eliminates or reduces disadvantages and problems associated with prior systems.

More specifically, the present invention provides a system for packing data in a video processor. The system comprises a plurality of buffer memories and a multiplexer. The buffer memories are each operable to store video lines for a horizontal strip of a video field. The multiplexer receives video data from the buffer memories. The multiplexer combines one line of video data from each buffer memory into a single line of video data for processing by the video processor so as to allow vertical processing of the video lines for each horizontal strip.

It is a technical advantage of the present invention to provide a system for packing data into a video processor such that the processing capacity of the video processor is efficiently used.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF THE INVENTION

Figure 1:
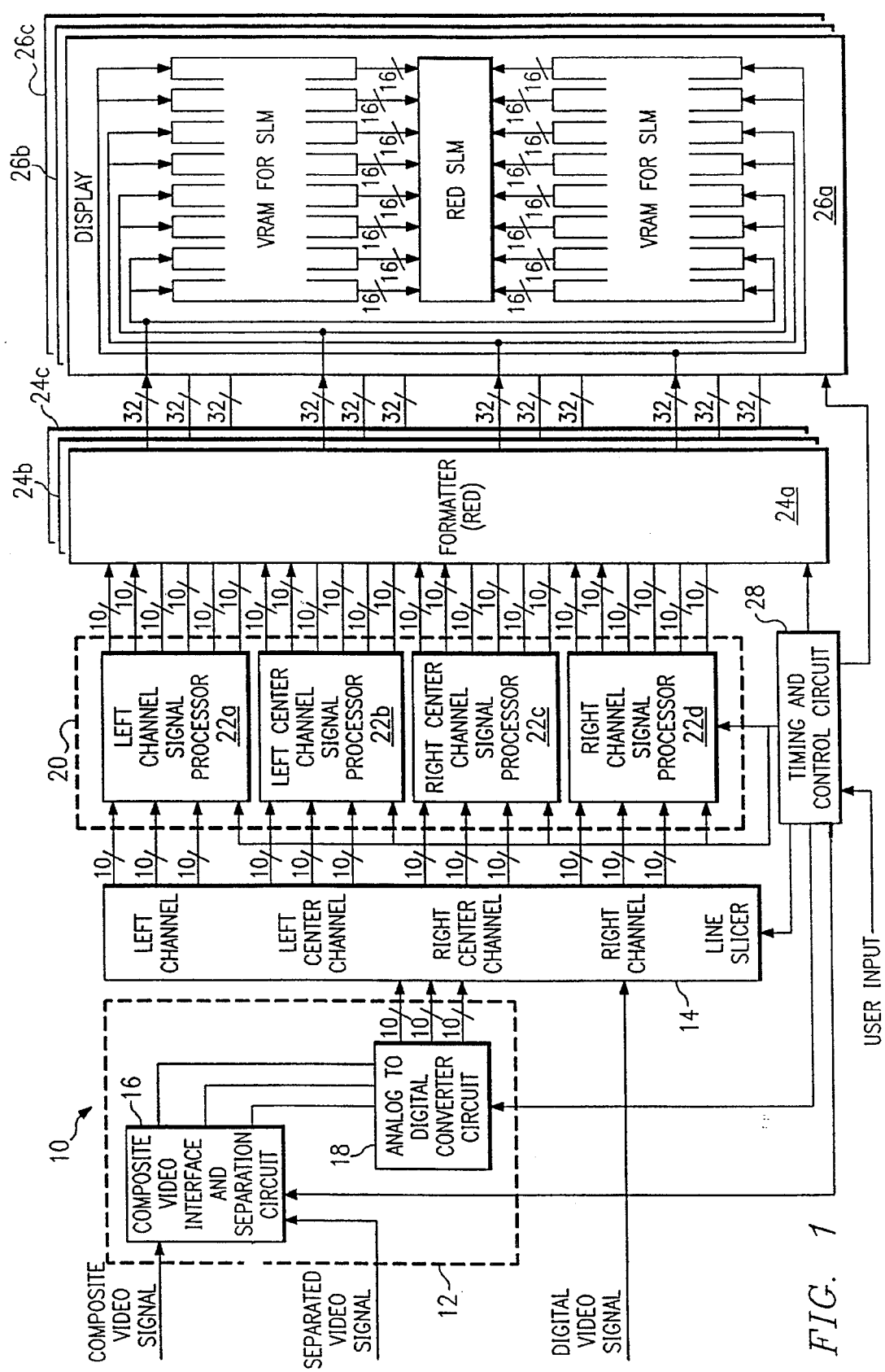
FIG. 1 illustrates a digital television system constructed according to the teachings of the present invention.

FIG. 1 illustrates a digital television system indicated generally at 10 and constructed according to the teachings of the present invention. System 10 comprises a parallel architecture wherein input video signals may be divided into channels to be processed in parallel. For example, system 10 may implement appropriate functions such that a standard video signal may be used to provide a high definition video display. Alternatively, system 10 may sample and display a high definition video signal.

System 10 may receive video signals in composite or component form. For example, system 10 may receive an analog composite video signal, an analog video signal in component form, or a digital video signal. System 10 may convert a composite video signal into a plurality of video signals for processing. For example, an analog composite video signal in the format established by the National Television Standards Committee (hereinafter "NTSC") may be separated into a luminance signal, identified by the symbol Y, and two color difference signals, identified by the symbols I and Q. Alternatively, system 10 may separate other standard composite video signals into appropriate video signals for processing according to Table 1 below.

TABLE 1

| Input Video Format | Color Space Domain |
| --- | --- |
| NTSC | Y, I, Q |
| PAL and SECAM | Y, U, V |
| SMPTE 240M, SMPTE 260M | Y, Pr, Pb |

It is noted that the other standard video formats include: Phase Alternating Line, hereinafter "PAL"; Sequential Color with Memory, hereinafter "SECAM"; and Society of Motion Picture Engineers, hereinafter "SMPTE".

Each of these standard video signals comprise a luminance signal, hereinafter "luma" or "Y" and a chrominance signal, hereinafter "chroma" or "C". The chroma signal may be further divided into appropriate color difference signals as shown in Table 1. For clarity, each of the standard video signals may hereinafter be referred to as providing a video signal in a "color difference color space" or a "Y-I-Q color space." As an alternative to the standard video signals of Table 1, a video source may be coupled to system 10 to provide a red video signal, hereinafter "R", a green video signal, hereinafter "G", and a blue video signal, hereinafter "B". Such a video source may hereinafter be referred to as providing a video signal in an "R-G-B color space."

System 10 prepares a video signal for parallel processing in receiving circuitry 12, and line slicer 14. Receiving circuitry 12 may receive, for example, a composite video signal in the NTSC format from an external source (not explicitly shown). Alternatively, receiving circuitry 12 may receive separate Y and C video signals. Furthermore, receiving circuitry 12 may receive separate video signals in an R-G-B color space.

Receiving circuitry 12 comprises composite video interface and separation circuit 16 coupled to analog to digital converter circuit 18. Composite video interface and separation circuit 16 may separate a composite video signal into, for example, three separate video signals. Analog to digital converter circuit 18 may convert each of the separate video signals into ten bit digital video signals. Analog to digital converter circuit 18 of receiving circuitry 12 is coupled to provide three ten bit digital video signals to line slicer 14. Additionally, a digital video signal may be coupled directly to line slicer 14.

Line slicer 14 divides each digital video signal into a plurality of separate channels for each line of composite video signal. For example, line slicer 14 may divide each digital video signal into four, five or another appropriate number of channels. The number of channels may depend on the number of pixels in a line of video signal, and the number of pixels that may be simultaneously processed by a video signal processor of system 10. Line slicer 14 may provide appropriate overlap between the various channels for processing as described below.

System 10 processes the digital video signals in processing circuitry 20. Processing circuitry 20 is coupled to line slicer 14. Processing circuitry 20 comprises a plurality of channel signal processors 22a through 22d. The number of channel signal processors 22 may be equal to the number of channels provided by line slicer 14. Each channel signal processor 22a through 22d receives all three 10 bit digital video signals for the channel corresponding to that signal processor 22a through 22d. Processing circuitry 20 may convert each line of digital video signal into two lines of digital video signal output. Each channel signal processor 22a through 22d, therefore, may have six separate outputs, for example, two ten bit red outputs, two ten bit green outputs, and two ten bit blue outputs. Additionally, processing circuitry 20 may perform the following functions: color space conversion, gamma correction, and picture quality control which will be described in detail below.

System 10 reconnects and displays the processed video data. A plurality of formatters 24a through 24c reconnect the video data and a plurality of displays 26a through 26c display the video data. One formatter 24a through 24c and one display 26a through 26c operate on a different digital video signal as indicated in FIG. 1. For example, formatter 24a and display 26a may operate on a red video signal. Formatter 28b and display 26b may operate on a green video signal. Finally, formatter 24c and display 26c may operate on a blue video signal.

Two ten bit outputs of each channel signal processor 22a through 22d are coupled to an appropriate formatter 24a through 24c. Formatters 24a through 24c remove overlap between adjacent channels, reconnect the channels, and prepare the reconnected digital video signals for display on displays 26a through 26c. Formatters 24a through 24c each provide 128 bit words in four 32 bit channels to displays 26a through 26c. Displays 26a through 26c may comprise, for example, a Spatial Light Modulator (hereinafter "SLM") such as a 2×128 pin Digital Micromirror Device (hereinafter "DMD") produced by TEXAS INSTRUMENTS INCORPORATED. However, displays 26a through 26c are not limited to digital displays. It is within the scope of the teachings of the present invention for the processed video signal to be displayed on an analog display.

Timing and control circuit 28 is coupled to composite video interface and separation circuit 16, analog to digital converter circuit 18, line slicer 14, processing circuitry 20, formatters 24a through 24c, and displays 26a through 26c. Timing and control circuit 28 is operable to control the timing of each aspect of system 10. The timing of system 10 may be accomplished through use of a synchronization (hereinafter "sync") signal supplied to timing and control circuit 28 by composite video interface and separation circuit 16. Additionally, timing and control circuit 28 is operable to accept user inputs to control the timing of various functions of system 10. For example, timing and control circuit 28 may receive user inputs to select the type of input video signal coupled to receiving circuitry 12. Furthermore, timing and control circuit 28 may accept information for processing circuitry 20 such as a scaling factor, a gamma correction factor, the desired processing method, and picture control functions; each of which are described more fully below. Furthermore, timing and control circuit 28 may receive a specific sampling rate for analog to digital converter circuit 18.

In operation, system 10 may prepare a standard video signal to produce a high definition display. As described previously, system 10 may receive analog or digital video signals in composite or separated form. For conciseness, the operation of system 10 is described in conjunction with receiving an analog composite video signal. System 10 separates a composite video signal into video signals, divides the video signals into a plurality of channels, and processes the channels in parallel. An advantage of using a parallel architecture in system 10 is that system 10 is able to process the video signals at a low speed while providing a high definition display. Consequently, system 10 may incorporate existing video processor components.

Composite video interface and separation circuit 16 separates the composite video signal into, for example, three separate video signals. Composite video interface and separation circuit 16 may, for example, separate a composite video signal into Y, I, and Q video signals of the NTSC standard.

Analog to digital converter circuit 18 may sample each video signal at a frequency of, for example, 71.1 MHz. The appropriate sampling rate may depend on the number of pixels allocated for a line of video on displays 26a through 26c, and the time for one line of video signal to be received by receiving circuitry 12. Therefore, the sampling rate may be adjusted to create a predetermined number of pixels for each line of video signal. Analog to digital converter circuit 18 may comprise, for example, Analog to Digital Converter board AD9060 produced by ANALOG DEVICES. Alternatively, analog to digital converter circuit 18 may comprise another appropriate analog to digital converter device operable to sample data at an appropriate sampling rate on the order of 75 MHz.

Figure 2:
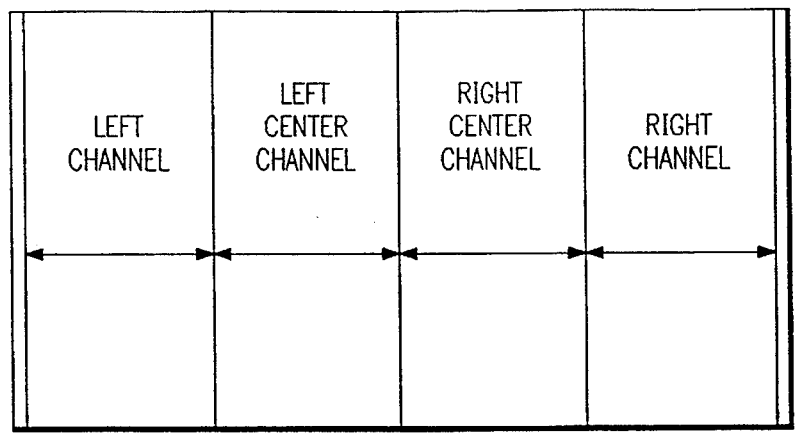
FIG. 2 illustrates four vertical strips created by the system of FIG. 1.

Line slicer 14 divides each digital video signal into a plurality of separate channels for each line of video signal. For example, line slicer 14 may divide each line of the digital video signal into four channels so that the video signal may be processed in parallel. By dividing each line of digital video signal in the same manner, each channel signal processor 22a through 22d effectively processes one vertical strip of each video frame. FIG. 2 shows the four vertical strips processed by channel signal processors 22a through 22d for the embodiment of FIG. 1. Alternatively, line slicer 14 may divide a line on a pixel by pixel basis or line slicer 14 may divide a video frame into horizontal strips. An advantage of dividing a video frame into vertical strips is that the related processing steps performed by processing circuitry 20 are simplified.

Figure 3:
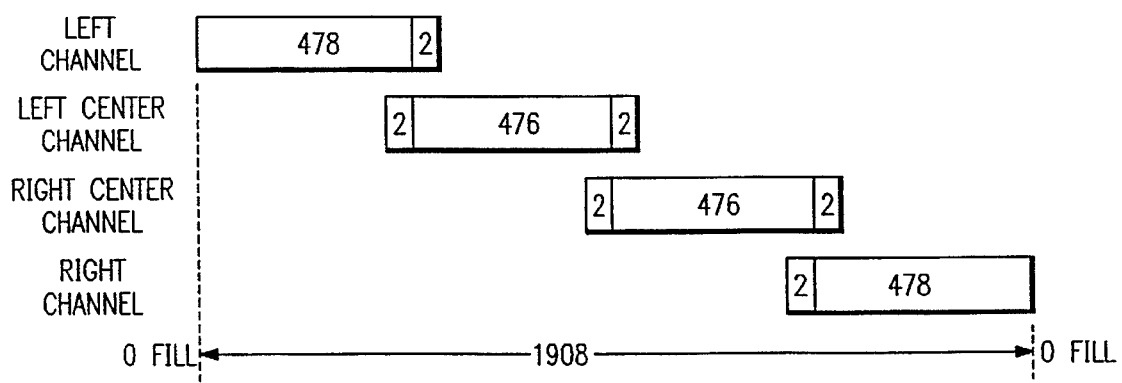
FIG. 3 illustrates the overlap in pixels between adjacent channels created by the system of FIG. 1.

Additionally, line slicer 14 may provide for overlap between the vertical channels by providing common pixels to adjacent channels as shown in FIG. 3. The overlap may comprise, for example, from one to five pixels. The overlapping pixels may be used to provide appropriate data for each channel to perform the various functions described below as called for by processing circuitry 20. The amount of overlap between channels may be varied depending of the specific functions implemented in processing circuitry 20.

System 10 processes the digital video signals in processing circuitry 20. Processing circuitry 20 may perform the progressive scan function (hereinafter "proscan"). Proscan "de-interlaces" a video signal by creating an entire video frame from a single or multiple video fields at the field rate. As described previously, a standard video signal may comprise two fields of video data for each frame. Additionally, processing circuitry 20 may convert the digital video signals into a different color space. For example, processing circuitry 20 may convert digital video signals from a color difference color space to an R-G-B color space. Furthermore, processing circuitry may remove a gamma curve from a standard video signal. Finally, processing circuitry 20 may control the quality of a video display in response to user inputs such as inputs for adjustments to brightness, hue, contrast, sharpness and saturation. Each of these functions is described in detail below.

System 10 reconnects and displays the processed digital video signal using formatters 24a through 24c and displays 26a through 26c. Formatters 24a through 24c remove overlap between adjacent channels. Additionally, formatters 24a through 24c prepare the reconnected digital video signals for display on displays 26a through 26c. For example, formatters 24a through 24c may produce a plurality of bit planes from the reconnected digital video signals. Each bit plane may correspond to a particular bit for each pixel in a particular video frame. In the embodiment of FIG. 1, formatters 24a through 24c each may produce 10 bit planes of video data for each separate video signal that are to be provided to displays 26a through 26c in 128 bit words. Based on the output of formatters 24a through 24c, displays 26a through 26c may project appropriate images corresponding to the processed video signals on, for example, a screen (not shown). The combination of the different video signals output by displays 24a through 24c result in a single, appropriately colored, image.

It should be understood that system 10 may be operable to be programmed to accept any appropriate standard analog or digital video signal. Alternatively, system 10 may be preprogrammed to accept only a limited number of appropriate standard analog or digital video signals.

Channel signal processors 22a through 22d may include one or more scan line video processors (SVPs), produced by TEXAS INSTRUMENTS INCORPORATED, per separated video signal input. As currently produced by TEXAS INSTRUMENTS INCORPORATED, the SVP may process a line of up to 960 pixels at one time. Therefore, processing a line of less than 960 pixels does not efficiently use the processing capabilities of the SVP. Each channel of the embodiment of FIG. 1 may comprise 480 pixels. To more efficiently use the SVP, multiple lines may be combined and processed simultaneously in the SVPs.

Figure 4:
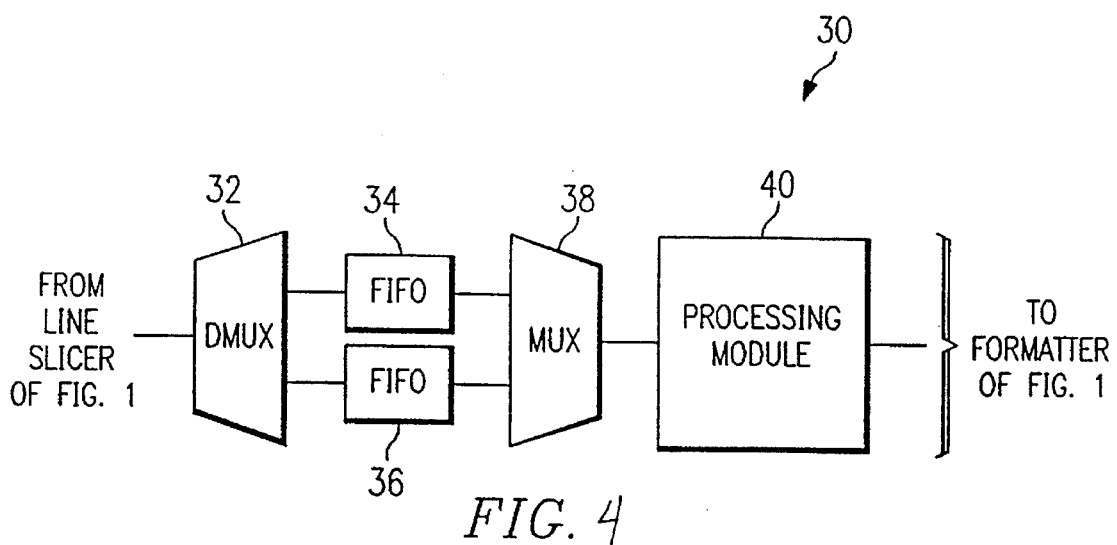
FIG. 4 illustrates a data packing circuit constructed according to the teachings of the present invention.

FIG. 4 illustrates a data packing circuit indicated generally at 30 and constructed according to the teachings of the present invention. Each processing module 22a through 22d of FIG. 1 may comprise one data packing circuit 30 for each separated video signal input. For conciseness, data packing circuit 30 will only be described with respect to one separated video signal input. It is understood that the description of data packing circuit 30 is equally applicable to each separated video signal input.

Data packing circuit 30 comprises demultiplexor 32, first and second first in-first out buffer memories 34 and 36, respectively, and multiplexor 38. Demultiplexor 32 is coupled to receive a separated video signal from line slicer 14 of FIG. 1. Demultiplexor 32 is coupled to first and second first in-first out buffer memories 34 and 36. First and second first in-first out buffer memories 34 and 36 are coupled to multiplexor 38. The Output of multiplexor 38 is coupled to a processing module 40 having at least one SVP.

Figure 5:
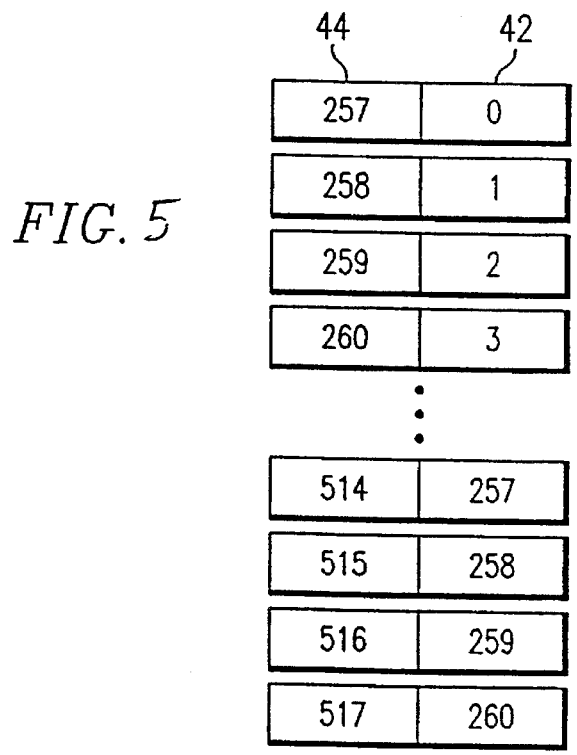
FIG. 5 illustrates the combination of lines from first and second parts of a video field as prepared by the circuit of FIG. 4.

In operation, a video field may be divided into first and second parts 42 and 44 with a predetermined overlap between the parts. Each part 42 and 44 may comprise approximately one-half of the video field. One line from first part 42 may be combined with one line from second part 44 as shown in FIG. 5. The combined lines may be processed as one line by an SVP. The overlap between the parts may, for example, allow implementation of an N-tap vertical filter by the SVP as explained below.

First and second parts of a video field 42 and 44 may be separated and stored by demultiplexer 32, and first and second first in-first out buffer memories 34 and 36. Demultiplexor 32 may communicate first part 42 of a video field to first in-first out buffer memory 34 and second part 44 of the video field to second first in-first out buffer memory 36.

Multiplexor 38 may combine one line of video data from first in-first out buffer memory 34 with one line of video data from second first in-first out buffer memory 36. For example, multiplexor 38 may output line 0 from first in-first out buffer memory 34 followed by line 257 from second first in-first out buffer memory 36. By combining successive lines of first and second first in-first out buffer memories 34 and 36, multiplexor 38 may provide appropriate pairs of video lines to processing module 40. These line pairs may be processed as a single line by an SVP.

FIG. 5 illustrates the output of data packing circuit 30. First part 42 of a video field is processed in a first half of the SVP and second part 44 is processed in a second half of the SVP. To provide for an N-tap vertical filter, data packing circuit 30 may provide for an overlap of at least N-1 lines in both first and second first in-first out buffer memories 34 and 36. For example, a 5-tap vertical filter may be implemented for a video field comprising 518 lines by storing lines 257 to 260 in both first and second first in-first out buffer memories 34 and 36. In this manner, the overlapping lines will be processed in both the first and second halves of the SVP.

Vertical processing of a video line may require access to two lines of video data above and two lines of video data below the line of video being processed. The overlap provided by data packing circuit 30 allows vertical processing of lines 257 through 260. Lines 257 and 258 have access to two lines above and two lines below the line being processed in first part 42 of a video field. Similarly, lines 259 and 260 have access to two lines above and two lines below the line being processed in second part 44 of a video field.

Although the present invention has been described in detail, it should be understood that various changes, substitutions and alterations may be made hereto without departing from the spirit and scope of the invention as defined by the appended claims. For example, it is within the teachings of the present invention to provide various amounts of overlap between the parts of the video field in data packing circuit 30. Furthermore, the number of parts into which the video field is divided may similarly be varied.

What is claimed is:

1. A system for packing data in a video processor, comprising:

a plurality of buffer memories, each operable to store video lines for a horizontal strip of a video field; and a multiplexer responsive to said buffer memories and operable to combine one line of video data from each buffer memory into a single line of video data for processing by the video processor so as to allow vertical processing of the video lines for each horizontal strip.

2. The system of claim 1, wherein the plurality of buffer memories comprises two buffer memories.

3. The system of claim 1, wherein the plurality of buffer memories comprises first and second first in-first out buffer memories.

4. The system of claim 1, and further comprising a demultiplexer for communicating the horizontal strips of video field to said buffer memories.

5. A system for packing data in a video processor, comprising:

a demultiplexer operable to receive a video signal and operable to create horizontal strips of each video field;

a plurality of buffer memories responsive to said demultiplexer, each operable to store video lines for a horizontal strip of a video field; and a multiplexer responsive to said buffer memories and operable to combine one line of video data from each buffer memory into a single line of video data for processing by the video processor so as to allow vertical processing of the video lines for each horizontal strip.

6. The system of claim 5, wherein the plurality of buffer memories comprises first and second buffer memories.

7. The system of claim 5, wherein the plurality of buffer memories comprises first and second first in-first out buffer memories.

8. A method for packing video data in a video processor, comprising the steps of:

storing a plurality of horizontal strips of a video field in a plurality of buffer memories;

combining one line of video data stored in each buffer memory to form a single line of video data for processing by the video processor;

communicating the combined line of video data to the video processor; and performing vertical processing on said combined line of video data at said video processor.

9. The method of claim 8, wherein the step of storing a plurality of horizontal strips comprises the step of storing a first horizontal strip comprising approximately the top half of a video field and storing a second horizontal strip comprising approximately the bottom half of a video field.

10. The method of claim 8, wherein the step of storing a plurality of horizontal strips comprises the step of storing horizontal strips that overlap with adjacent strips for vertical processing.

* * * * *